Nov. 19, 1929.　　G. SCHLÖSSER　　1,736,093
METHOD OF AND DEVICE FOR CONVEYING BUILDING MATERIALS
Filed June 16, 1926　　4 Sheets-Sheet 1

Inventor:
G. Schlosser
By Marks & Clerk
Attys

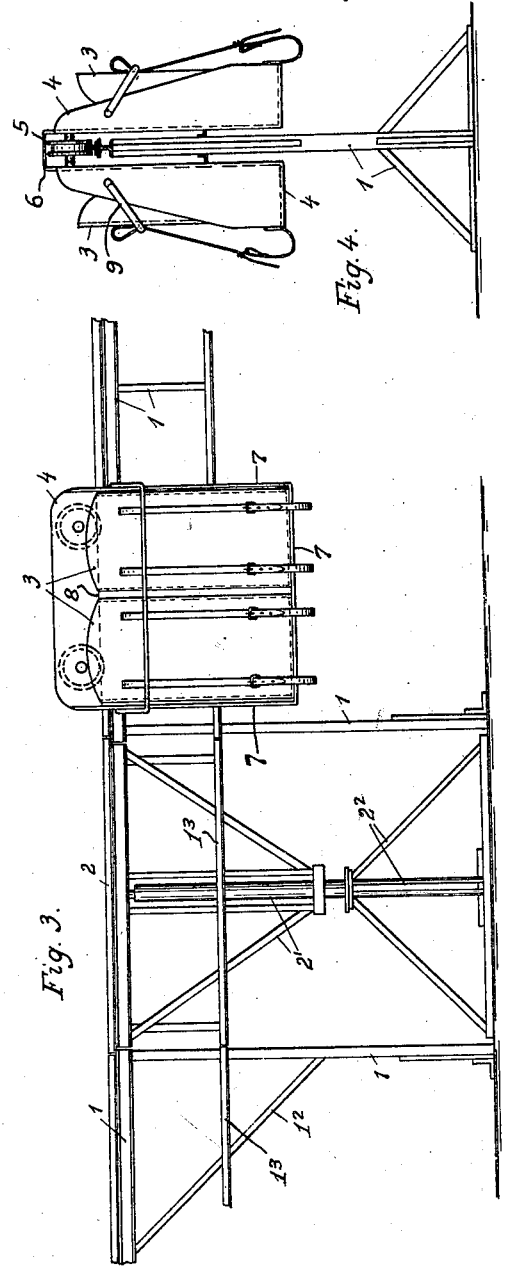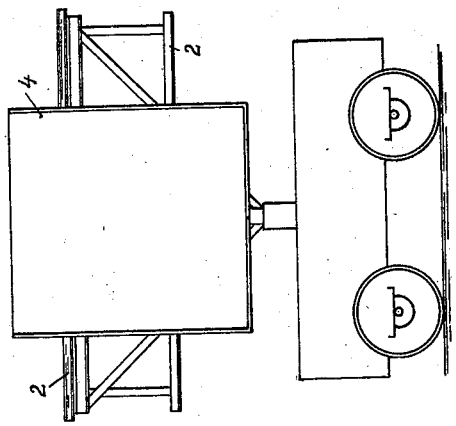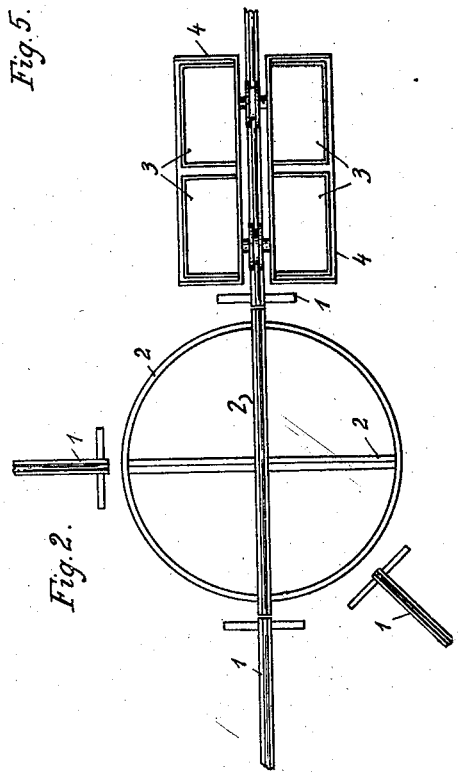

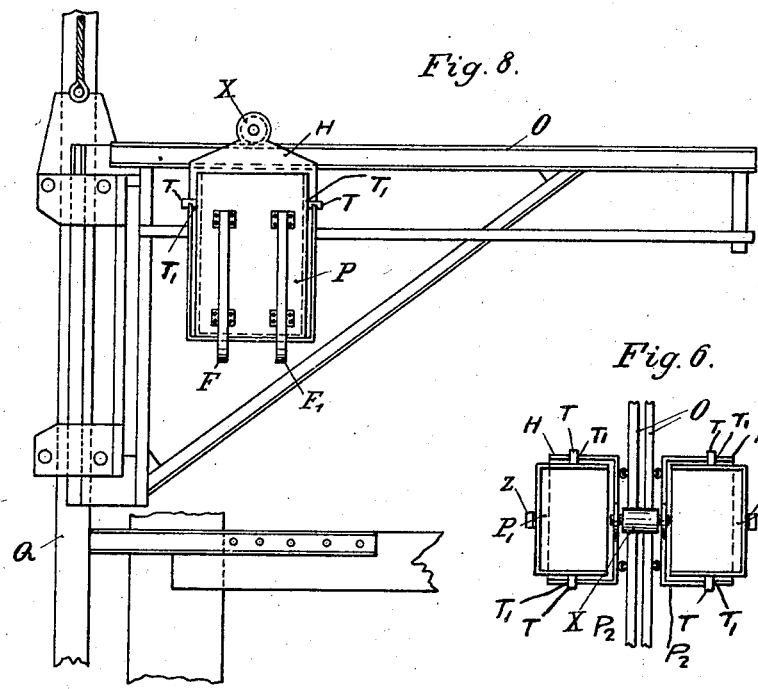

Nov. 19, 1929. G. SCHLÖSSER 1,736,093
METHOD OF AND DEVICE FOR CONVEYING BUILDING MATERIALS
Filed June 16, 1926 4 Sheets-Sheet 4
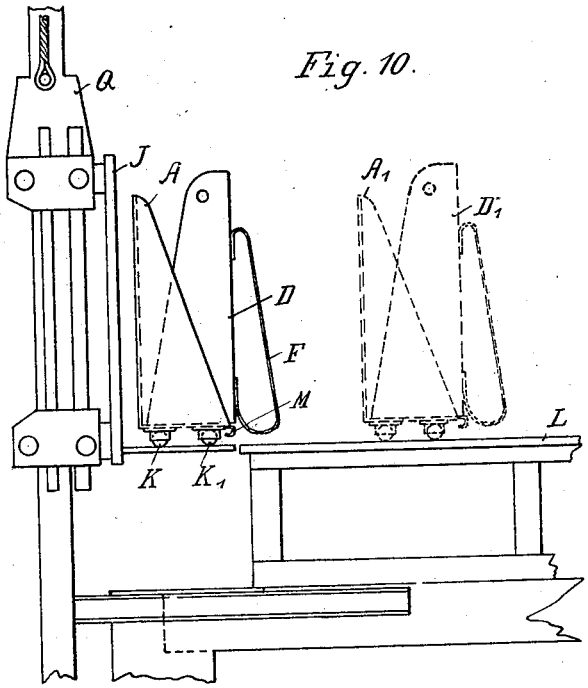
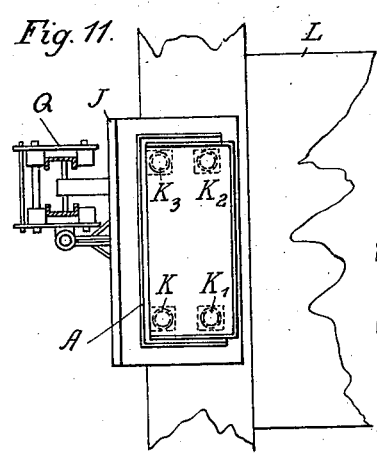
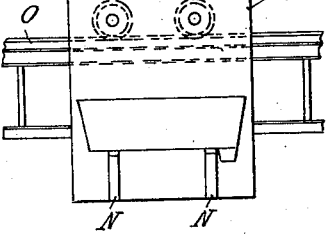
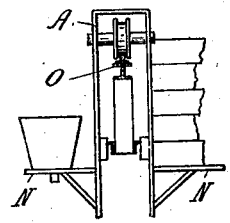
Inventor
G. Schlosser
By Marks & Clerk
Attys Patented Nov. 19, 1929

1,736,093

UNITED STATES PATENT OFFICE

GUSTAV SCHLÖSSER, OF OBERSCHONEWEIDE, NEAR BERLIN, GERMANY

METHOD OF AND DEVICE FOR CONVEYING BUILDING MATERIALS

Application filed June 16, 1926, Serial No. 116,459, and in Germany June 22, 1925.

This device relates to a method and apparatus for conveying material such as bricks, mortar, etc. used in the construction of buildings from the place of storage or preparation, to the workmen at the various parts of the building which is under construction.

One of the objects of the invention is to provide elements which are easy of transportation and which can be set up and used in connection with any type of building.

A further object of the invention is to provide means for conveying the material to a hoist and to carry such material from the hoist in such a manner that various kinds of material desired can be obtained from various points of location and delivered to any desired point of use on the building construction.

A further object is to provide a means for conveying the material that is easy to load and unload and in which the unloading will be rapid and without possibility of injury to the material.

The device consists of a system of tracks located both on the ground and on the various floors of a building connected through a hoist with conveying receptacles or cars to run on the track. Located in the track system are movable track sections to shunt or switch the receptacles to any desired radiating track. These movable track sections are supported to rotate.

The receptacles or cars are so constructed that several load units of material can be conveyed either for depositing different materials at the same or different points or the same material at different points.

Furthermore the cars are adapted to discharge their content in a manner to prevent injury to the material.

Various other objects and advantages will appear from the following description, reference being made to the drawing showing the embodiments of the invention in which:—

Fig. 2 is a plan view showing the means for switching the cars to the various tracks.

Fig. 3 is a side view of the device shown in Fig. 2.

Fig. 4 is an end elevation of the showing of Fig. 3.

Fig. 5 shows an element of the device mounted in a vehicle for transportation.

Fig. 6 is a top plan view showing the car mounted on the track.

Fig. 7 is an end elevation of Fig. 6.

Fig. 8 is a side view showing a form of hoist that may be employed.

Fig. 9 is a view similar to Fig. 7 showing a modified form of track and car.

Figs. 10 and 11 show a modified form of track and receptacle.

Figs. 12 and 13 show modified forms of receptacle or car for use with the type of track shown in Figs. 6 and 7.

Figure 1:
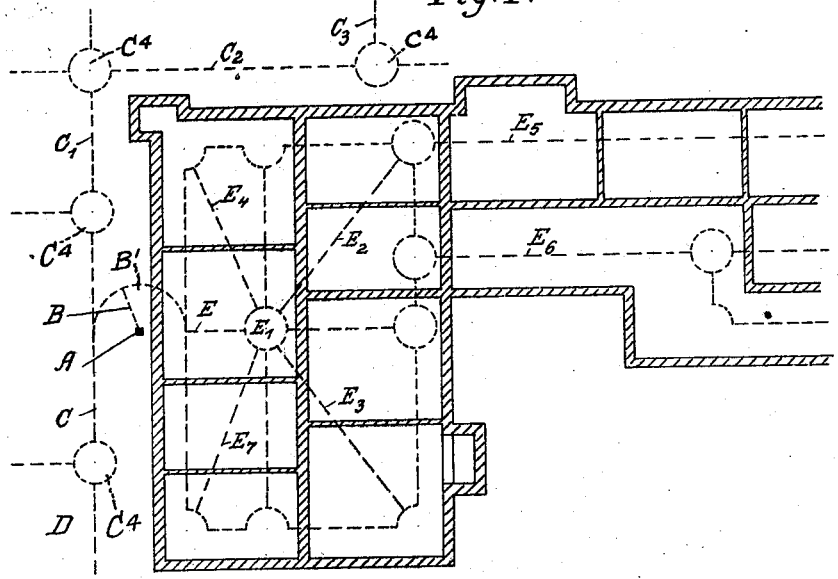
Fig. 1 is a diagrammatic view showing the track system with the floor plan of a building.

In the diagrammatic view of Fig. 1, A represents the hoist, with the track section B mounted thereon which can be swung in the arc shown by the dotted line B'. D is the track system mounted on the ground which consists of the track sections C, $C_1$, $C_2$, $C_3$, connected by the switch elements $C_4$.

E represents a similar track system, mounted on the floor or staging of a building in construction, consisting of the track sections E, $E_2$, $E_3$, $E_4$, $E_5$, $E_6$, $E_7$ connected by the switching elements $E_1$.

Figure 14:
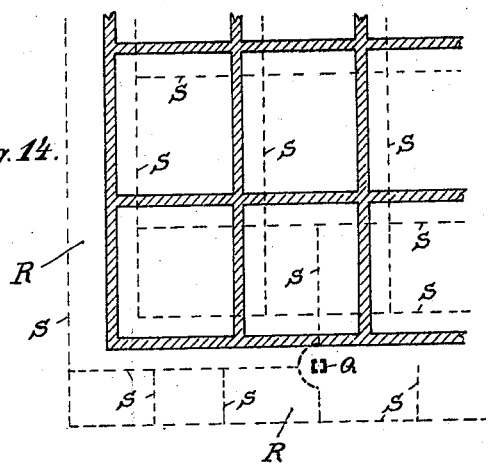
Fig. 14 is a diagrammatic view showing an arrangement of the device with the floor plan of building.

In the diagrammatic view of Fig. 14 a similar system is shown as in Fig. 1 with Q representing the hoist and R the track system both on and outside the building of which S denotes the track sections.

Referring more particularly to the device as shown in the various other figures of the drawing, 1 represents the track supported by the posts 1' and the braces $1^2$. A plurality of tracks radiate from a common center from which they are spaced an equal distance. A track member 2 whose length is twice the distance from the above mentioned center to the end of the track section 1 is mounted on a support consisting of socket member 2', which is rotatably mounted on the pedestal $2^2$. By the means above described this track section can be rotated into alinement with any one of the radiating tracks above referred to and a load carrier mounted on either of the track sections 1 or the rotating track 2 can be moved from one to the other. On each side of the track sections and pivoted track member are rails 1³ secured to the support members thereof whose function and purpose will be more definitely pointed out.

Mounted on the track sections by means of the flanged wheel 5 are the load carriers 4. These carriers consist of the inverted U-shaped member 6 (Figs. 3 and 4) having the flanged wheel 5 journaled at the base of the U, the flange of the wheel straddling the rail. The inside of the legs of the U-shaped member engage the guiding members 1³ of the track thereby holding the load carriers in a vertical position. From the sides and bottom of each of the U-shaped members extend the members 7 forming an open sided box. Parallel with the side member 7 are the partitions 8 which divide each of the box-like members into two compartments. A trough shaped member 3 having sides and closed at one end is supported on the load carrier 4 and is secured therein by the pivoted bail 9. This trough shaped member directly carries the load and can be operated to act as a chute by moving it on its support in the carrier 4 to discharge its load by gravity. The trough shaped member is provided with two straps by means of which it can be used as a pack and carried by a workman on his back. Each of the load carriers can, by reason of the partition, carry two of the devices 3.

In the modification of Figs. 6 and 7 the rail is formed of two U-shaped angle irons O secured to the supports with the flanges of the irons extending laterally to the device. The load carrier consists of two plate-like members P₂ secured together by the roller X. Each of the plate members P₂ are provided with laterally extending sides H having circular notches T in their upper edges. Supported in such notches T by means of laterally extending bearings T¹ is the trough-shaped load carriers P¹ having handles Z at their lower edges by means of which the load carriers can be swung to discharge the load as is indicated by the position shown to the right of Fig. 7.

In the modification shown in Fig. 9 the load carriers P₂ are of box-like form having the bottom member G pivoted to swing to a position to discharge or retain the load.

In the modifications of Figs. 12 and 13 the load carriers are in the form of U-shaped members having the flanged wheels of Figs. 2, 3 and 4 and in which the legs of the U are provided with brackets N, upon which the load can be supported.

As a means for moving the load carriers to a position to be transferred from the rail system on the ground to the rail system on the building or from the building to the ground, there is provided a hoisting member consisting of the vertical guide member Q on which the rail member 1 counter part in construction to the rail member of the track heretofore described is adapted to be raised or lowered to a position adjacent the rail system on the ground or building and the rail member swung into alinement therewith to transfer a load carrier from the rail on the hoist to either of the rail systems or in the opposite direction.

The modifications of Figs. 10 and 11 show a modified track system in which a narrow platform-like scaffold L supported in a somewhat raised position is the equivalent of the track of the other figures which have been described above. Upon the platform L are load carriers of the same design as those of Figs. 2, 3 and 4 but provided with ball castor wheels. Load carriers of this type could be used to run on any plane surface as the ground or the floor of the building. The hoist is modified to accord with this modified structure by providing a shelf-like bracket J on the movable member of the hoist.

Fig. 5 shows how the switching device of my invention can be loaded in a truck for transporting it.

Having described the nature of my invention and its operation, what I claim and desire to secure by Letters-Patent is:

1. In a conveying system for use in conveying material from stations on the ground to stations on a building in construction, the combination of a track system on the ground and a track system on the building, load carriers adapted to run on the track systems, of a hoist for transferring the load carriers in either direction from and to such track systems consisting of a vertically movable element, a track section attached to the movable element, a guide for the movable element and a pivotal connection between the movable element and the track whereby the track section on the hoist can be swung in a horizontal plane to bring such track section into alinement with the track of either the ground track system or the building track system.

2. In a system for use in conveying material from stations on the ground to stations on the building in construction, said second mentioned stations being at a greater elevation than said first mentioned stations, a plurality of tracks radiating from a common center and the ends of which are equally spaced therefrom, a rotatable track element adapted to be moved into alinement with any one of said tracks.

3. In a conveying system for conveying material, a carrier, a plurality of unitary sections in spaced horizontal planes, each section consisting of a support, a track mounted on the support, movable track sections, consisting of a track section, a support therefor, means for pivotally supporting the track sections on the support whereby such sections can be assembled to provide diverging tracks and intermediate switching and shunting means therebetween, and means for guiding said carrier from the track in one horizontal plane to the track in another horizontal plane.

In testimony whereof I have signed my name to this specification.

GUSTAV SCHLÖSSER.